Figure 1:
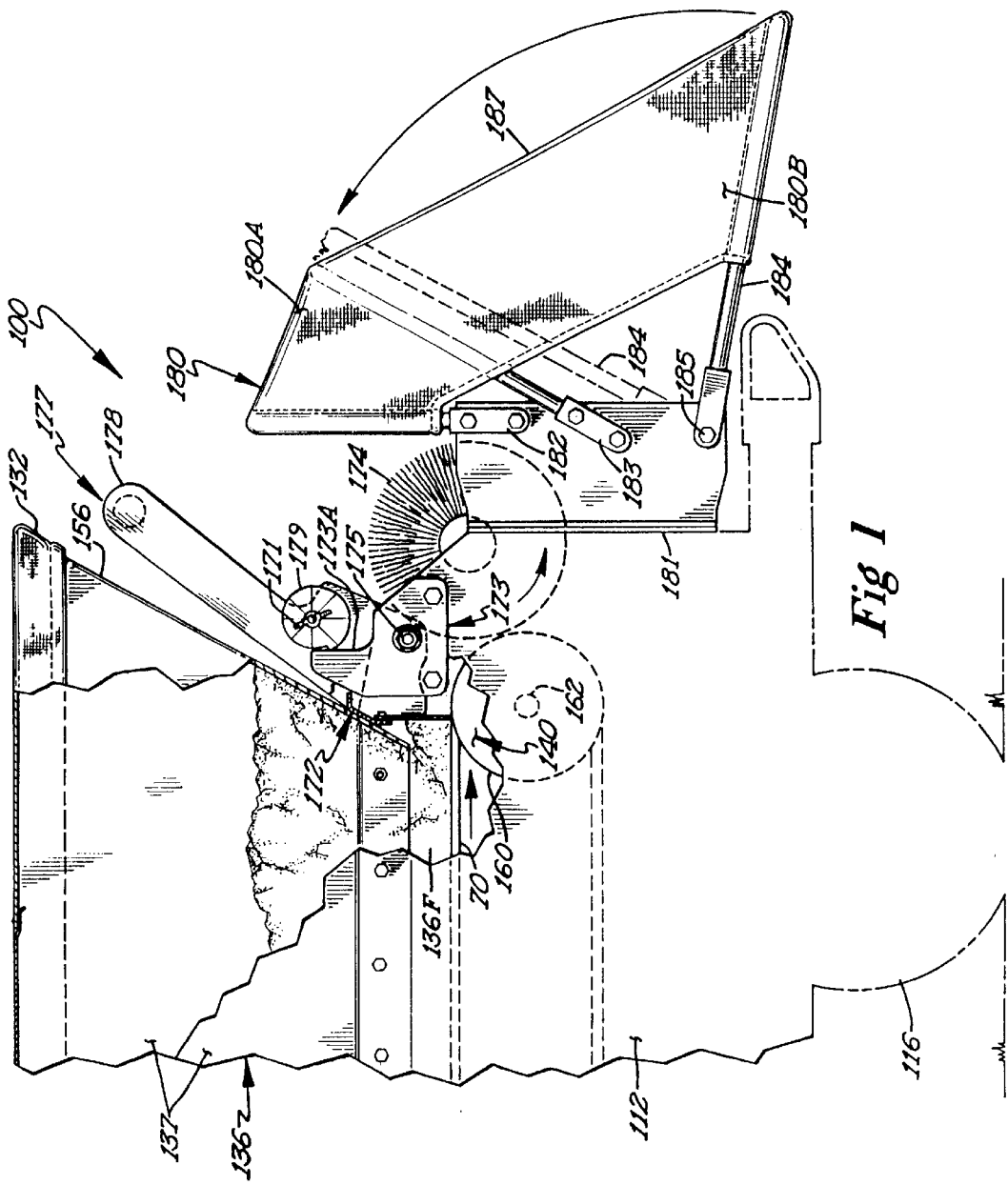

United States Patent [19]
Kinkead et al.

[11] Patent Number: 6,058,860
[45] Date of Patent: May 9, 2000

[54] SEEDER APPARATUS FOR DISPENSING SEED WITH OR WITHOUT TOP DRESSING

[75] Inventors: George B. Kinkead, St. Paul; Vernon J. Worrel, Mahtomedi; Scott Bjorge, Owatonna; Matthew A. Donner, St. Anthony, all of Minn.

[73] Assignee: Turfco Manufacturing Incorporated, Minneapolis, Minn.

[21] Appl. No.: 09/148,339

[22] Filed: Sep. 4, 1998

Related U.S. Application Data

[62] Division of application No. 08/675,653, Jul. 3, 1996, Pat. No. 5,802,994.

[51] Int. Cl.[7] .................................................. A01C 19/00
[52] U.S. Cl. .............................................. 111/11; 111/900
[58] Field of Search ................................. 111/11, 12, 13, 111/900, 905

[56] References Cited

U.S. PATENT DOCUMENTS

| | | | |
|---|---|---|---|
| 33,377 | 10/1861 | Brewer | 111/11 |
| 55,372 | 6/1866 | Sherwood . | |
| 106,546 | 10/1870 | Button | 111/11 |
| 112,299 | 2/1871 | Thomas . | |
| 147,874 | 2/1874 | Smith | 111/11 |
| 254,957 | 3/1882 | Grow . | |
| 260,315 | 6/1882 | Parry . | |
| 397,215 | 2/1889 | Ballard . | |
| 729,774 | 6/1903 | Kralinger et al. | 111/11 |
| 810,510 | 1/1906 | Robins, Jr. . | |
| 817,704 | 4/1906 | Garst . | |
| 874,982 | 12/1907 | Norton . | |
| T880,009 | 11/1970 | Harris . | |
| 930,089 | 8/1909 | Salzman . | |
| 979,200 | 12/1910 | Prosser . | |
| 1,515,987 | 11/1924 | Allison . | |
| 1,623,001 | 3/1927 | Gollbach | 111/11 |
| 1,639,203 | 8/1927 | Varnado . | |

(List continued on next page.)

FOREIGN PATENT DOCUMENTS

| | | | |
|---|---|---|---|
| 255546 | 11/1964 | Australia | 111/11 |
| 993310 | 8/1949 | France . | |
| 78543 | 6/1962 | France | 111/130 |
| 109636 | 5/1899 | Germany . | |
| 248403 | 3/1911 | Germany . | |
| 1180562 | 10/1964 | Germany | 111/12 |
| 2134615 | 1/1973 | Germany . | |
| 244274 | 3/1924 | Italy | 111/11 |
| 244274 | 1/1928 | Italy | 111/11 |
| 5137411 | 6/1993 | Japan | 111/11 |
| 5137412 | 6/1993 | Japan | 111/11 |
| 574179 | 9/1977 | U.S.S.R. | 111/11 |
| 963912 | 2/1983 | U.S.S.R. . | |
| 858411 | 1/1961 | United Kingdom | 111/925 |
| 873718 | 7/1961 | United Kingdom | 111/11 |
| 1215329 | 12/1970 | United Kingdom | 111/11 |
| WO8602520 | 5/1986 | WIPO . | |
| WO8807813 | 10/1988 | WIPO . | |

*Primary Examiner*—Christopher J. Novosad
*Attorney, Agent, or Firm*—Alan Kamrath; Oppenheimer Wolff & Donnelly LLP

[57] ABSTRACT

The seeder apparatus includes a first hopper for dispensing seeds onto a conveyor mechanism to be moved thereby to an entry nip between a rotary brush and the conveyor mechanism for propelling the seed downwardly at the discharge end of the frame on which the hopper is mounted. A shield assembly is mounted to the frame discharge end portion to minimize the effects of wind on the trajectory of seed or other material being propelled to the ground by a brush and conveyor mechanism. In one embodiment, a metering gate extends vertically in its closed position relative to the conveyor mechanism, the metering gate controlling the rate of dispensation of seed being moved to the entry nip. In a second embodiment, the seed hopper is mounted to a top dresser hopper whereby either seed from the seed hopper and/or dressing material from the top dresser hopper may be moved by the conveyor mechanism to the entry nip, with a top dressing metering gate being provided for controlling the rate of dispersion of material from the top dresser hopper to the entry nip.

21 Claims, 3 Drawing Sheets

U.S. PATENT DOCUMENTS

| | | |
|---|---|---|
| 2,030,541 | 2/1936 | Rose . |
| 2,141,044 | 12/1938 | Rassmann . |
| 2,321,082 | 6/1943 | Harshberger . |
| 2,490,971 | 12/1949 | Lawson et al. .................. 111/11 X |
| 2,550,872 | 5/1951 | Shaw ................................ 111/11 X |
| 2,602,669 | 7/1952 | Givenrod . |
| 2,619,355 | 11/1952 | Trees ................................ 111/11 X |
| 2,733,838 | 2/1956 | Neff . |
| 2,770,400 | 11/1956 | Mattson . |
| 2,774,602 | 12/1956 | Sanderson . |
| 2,865,536 | 12/1958 | Price . |
| 2,872,080 | 2/1959 | Thene . |
| 2,906,539 | 9/1959 | Ritter ................................ 111/11 X |
| 2,913,150 | 11/1959 | Seale . |
| 2,946,597 | 7/1960 | Simonsen . |
| 2,962,381 | 11/1960 | Dobry et al. . |
| 3,336,627 | 8/1967 | Nemoede et al. . |
| 3,392,884 | 7/1968 | Waldrum . |
| 3,561,380 | 2/1971 | Adams, Jr. . |
| 3,587,933 | 6/1971 | Regnier et al. . |
| 3,685,468 | 8/1972 | Paige et al. ........................... 111/11 |
| 3,693,890 | 9/1972 | Torrey . |
| 3,756,382 | 9/1973 | Adey, Jr. et al. . |
| 3,788,529 | 1/1974 | Christy . |
| 3,815,527 | 6/1974 | Dobbins ............................... 111/11 |
| 3,822,655 | 7/1974 | Benedict et al. . |
| 4,029,237 | 6/1977 | Miconi . |
| 4,234,105 | 11/1980 | Viramontes . |
| 4,288,008 | 9/1981 | Amblard et al. .................. 111/130 X |
| 4,436,226 | 3/1984 | Aggen . |
| 4,438,837 | 3/1984 | Stoppani et al. . |
| 4,438,873 | 3/1984 | Kaercher, Jr. . |
| 4,565,451 | 1/1986 | Winner . |
| 4,646,941 | 3/1987 | Grosse-Scharmann et al. ... 111/177 X |
| 4,709,861 | 12/1987 | Henderson . |
| 4,767,063 | 8/1988 | Wall et al. . |
| 4,804,145 | 2/1989 | Seymour et al. . |
| 4,896,615 | 1/1990 | Hood, Jr. et al. .................. 111/177 |
| 4,901,655 | 2/1990 | Magda . |
| 4,905,912 | 3/1990 | Bruch ................................ 111/11 X |
| 4,926,768 | 5/1990 | Magda . |
| 5,307,952 | 5/1994 | Worrel et al. . |
| 5,368,236 | 11/1994 | Meyer et al. ..................... 111/11 X |
| 5,802,994 | 9/1998 | Kinkead et al. .................. 111/11 |

Figure 2:
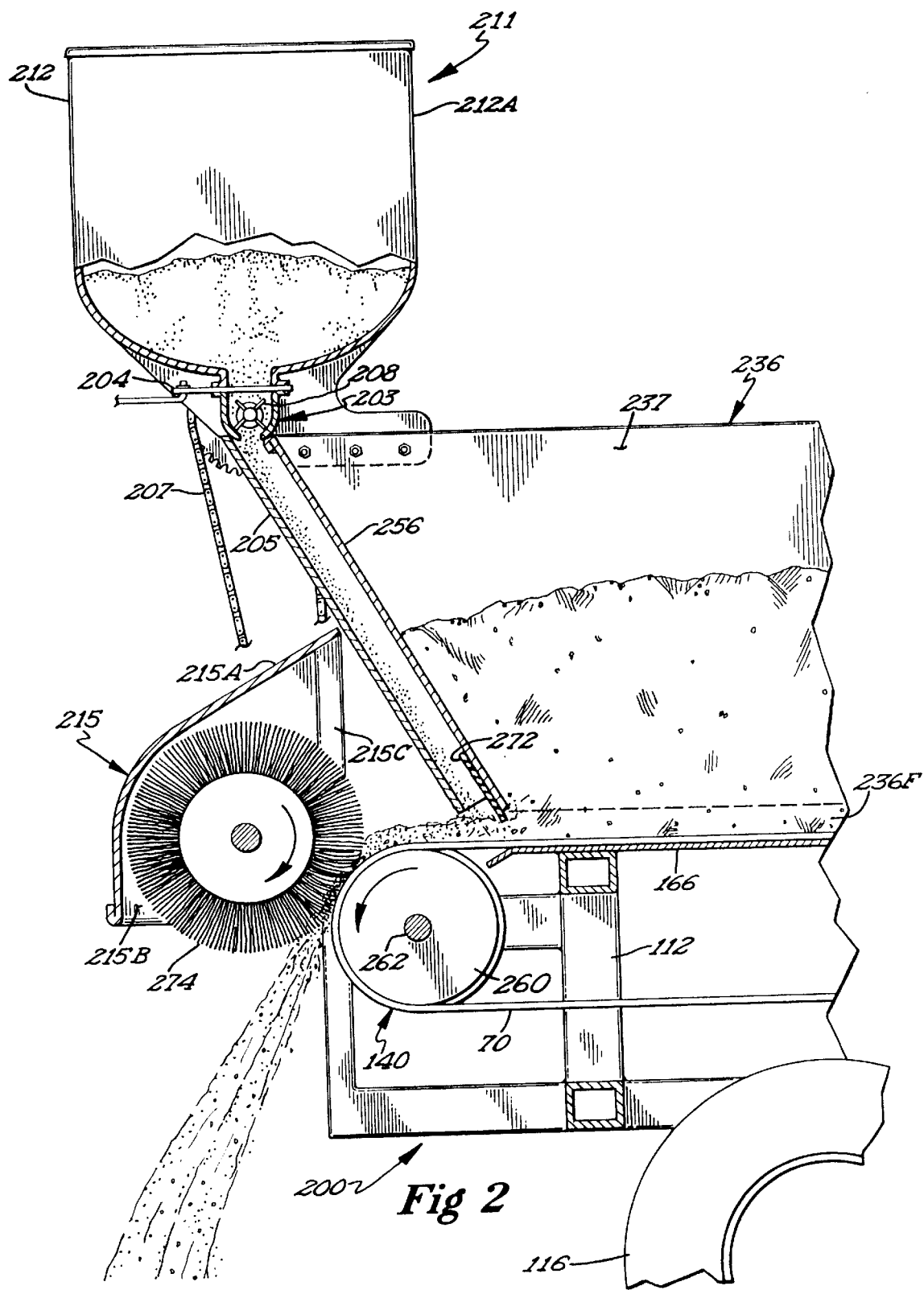

SEEDER APPARATUS FOR DISPENSING SEED WITH OR WITHOUT TOP DRESSING

CROSS REFERENCE

This application is a division of application Ser. No. 08/675,653 filed on Jul. 3, 1996, now U.S. Pat. No. 5,802,994.

FIELD OF THE INVENTION

This invention relates to apparatus for spreading seed, especially grass seed, onto the terrain, and more particularly to a top dresser and to a seeder attachment mountable to a top dresser for dispensing or spreading seed with or without spreading top dressing material for seeding and/or applying top dressing material to the terrain.

DESCRIPTION OF THE PRIOR ART

Various apparatus exist for applying top dressing to the turf of golf courses, lawns, football, baseball and soccer fields, parks, recreational areas and the like. One example of such apparatus is disclosed in U.S. Pat. No. 5,307,952 which is incorporated herein by reference. Further, it is old to provide seeders that rely on gravity (free fall) to move the seeds from the seed hopper to a prepared or non-prepared seed area (ground) and to seeders having a wheel rotatable about a vertical axis for spreading seed that falls from the hopper onto the wheel and thence relies on gravity to fall to the ground. With such seeders, when seeding grassy areas, frequently the seeds will lie on the grass or leaves without any contact with the soil. As a result the seeds do not germinate. In the event the seeds fall on the top of exposed soil, usually the soil contacts only the bottoms of the seed. Accordingly, the germination rate is not as high as desired.

Carrying out the application of top dressing to the terrain in one operation and the application of seeds to the terrain in a separate operation are more labor intensive and time consuming than desired, and having to provide two separate wheel supported vehicles to accomplish both operations, requires a greater investment in equipment than desired.

In order to obviate problems such as the above, this invention has been made.

SUMMARY OF THE INVENTION

In one embodiment the seeder apparatus includes a top dresser having a wheel supported frame for mounting a hopper for containing seed, a conveyor for moving seed from the hopper and beneath a vertically extending metering gate, and a rotary brush having bristles for contacting the conveyor to cooperate with the conveyor for downwardly propelling seeds on the conveyor that has passed beneath the metering gate onto turf or other areas that are to be seeded. A shield assembly is mounted to the frame opposite the brush from the metering gate to extend above and below the brush for shielding the downwardly propelled seed from the effects of wind.

A second embodiment of the seeder apparatus includes a seeder attachment mounted to a top dresser for dispensing seed onto the conveyor intermediate the top dresser metering gate and the brush with or without being dispensed onto top dressing material. The seeds and/or the dressing material is propelled downwardly by a brush cooperating with the conveyor. The seed attachment includes a seed hopper and a seed distributor for receiving seed from the seed hopper when the seed metering gate is open and dispensing the seed to fall onto a seed guide and thence onto the ribbon of top dressing, if any, on the conveyor after the dressing material has moved beneath the top dresser metering gate.

One of the objects of this invention is to provide new and novel means for dispensing and propelling seed onto a prepared or unprepared seed bed area. Another object of this invention is to provide a new and novel seeder attachment that is mountable to a top dresser for dispensing seed to be applied to turf with or without the dispensing of top dressing material. A further object of this invention is to provide new and novel combined seeder and top dresser means to selectively dispense and downwardly propel metered amounts of seeds and/or top dressing material onto turf or other terrain.

Another object of this invention is to provide a new and novel metering mechanism for controlling the rate of dispersion from a hopper, of seed or top dressing material that is to be applied to turf or other terrain. A further object of this invention is to provide new and novel means mountable to a seeder or top dresser for protecting the trajectory of dispensed seeds or other material from the effects of wind as the material is being propelled to the terrain.

BRIEF DESCRIPTION OF THE DRAWINGS

FIG. 1 is a fragmentary view of the first embodiment of the invention, with parts broken away;

FIG. 2 is a fragmentary view of the second embodiment of the invention, with parts broken away; and FIG. 3 is an enlarged fragmentary view of a portion of FIG. 1 to more clearly shown the metering gate mechanism.

DETAILED DESCRIPTION

The seeder apparatus of this invention includes a top dresser, generally designated 100, that may be of an endless conveyor-type such as disclosed in U.S. Pat. No. 4,438,873, which is incorporated herein by reference, and in particular to FIGS. 5 and 6 and the disclosure relative thereto. The top dresser 100 can be a self propelling motorized vehicle or can have a drawbar (not shown) that can be coupled to a motorized vehicle to be pulled in a longitudinal direction. The top dresser comprises a frame 112 movably supported by high flotation wheels 116.

A seed hopper, generally designated 136, is mounted on frame 112 and includes an open top covered by a removable closure 132, closed side walls 137, a discharge end wall 156 and a longitudinally opposite end wall (not shown). The hopper walls provide an open hopper bottom 136F that opens to a conveyor, generally designated 140. The conveyor 140 is disposed so that sheeting in the form of an endless belt 70 passes beneath the interior of the hopper 136, more specifically extends under the lower edge of the discharge end wall 156, so as to have gravitationally discharged thereon whatever material is contained in hopper 136. The discharge end wall extends at an included angle greater than 50 degrees and substantially less than 90 degrees with reference to the discharge end portion of the conveyor belt upper run and the horizontal. Desirably, the belt 70 has spaced ribs or channels (not shown) such as disclosed with reference to FIG. 6 of U.S. Pat. No. 5,307,952 wherein the ribs extend transversely across the belt, for example diagonally such as referred to in said patent. The endless belt 70 passes over a first, generally cylindrical roller 160 rotatably mounted on a transverse shaft 162 and over a second cylindrical roller (not shown). Roller 160 is rotated by any suitable means such as being ground driven in the manner shown in U.S. Pat. No. 4,438,873. Sheeting 70 passes over a platen or bed plate 166 that is fixedly supported by frame 112 of the top dresser 100 such as shown in FIG. 2. Conveyor 140 dispenses seeds from hopper 136 that have moved under the lower edge of the discharge end wall 156 onto the ground.

Figure 3:
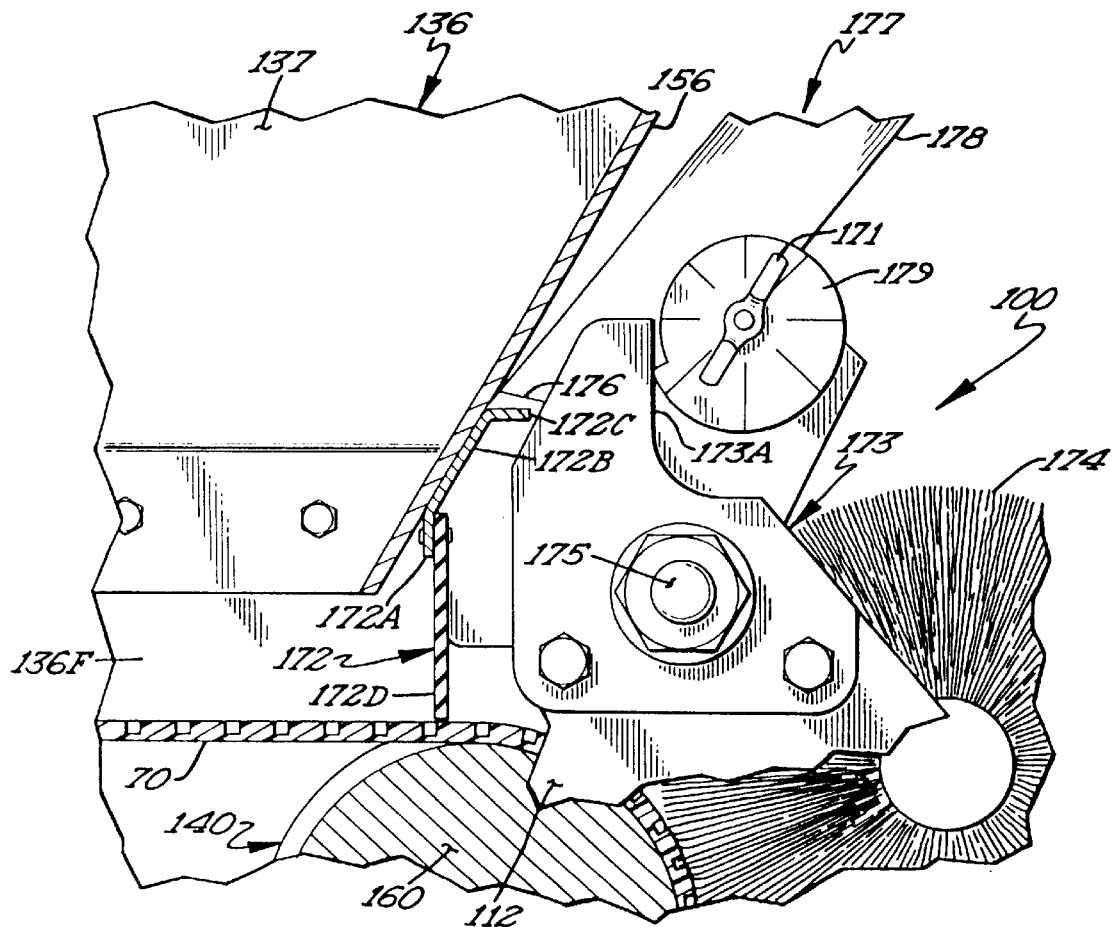

The seeder apparatus or top dresser 100 further includes a metering gate assembly, generally designated 177 (see FIG. 3), movably mounted at the discharge end wall 156 of hopper 136 and movably mounted to meter the amount of material to be dispensed as the conveyor belt upper run moves thereunder. The metering gate assembly includes transversely spaced frame brackets 173 mounted to frame 112. A transverse pivot rod 175 is pivotally mounted to the frame brackets 173, with mounting brackets 176 mounted to the pivot rod to pivot therewith. A metering gate 172 is mounted to the mounting brackets to pivot therewith and extends transversely between the side walls 137 and is movable relative to the conveyor between opened and closed positions. The metering gate in its closed position abuts against the upper run of the belt 70 to close the discharge opening between the upper run of the sheeting and the lower edge of the discharge end wall and extends perpendicularly to the belt upper run and, when moved to its open position to create a gap, is pivoted only a few degrees.

The metering gate 172 includes an upper metal part having an intermediate angle part 172B that extends across the width of the discharge end wall and at an angle relative to the conveyor belt upper run that is the same as the angle of the discharge end wall 156 relative to the belt discharge end portion when the gate is in its closed position. The metal part also includes a flange 172C joined to the angle part 172B to extend generally horizontally away from the discharge end wall and a lower part 172A. The lower part 172A mounts a lower gate part 172D of a somewhat flexible material, with the gate part 172D extending vertically (essentially perpendicular to the belt upper run) when the gate is in its closed position. Preferably the gate part 172D extends at an angle of a few degrees that is downwardly and horizontally in the direction of movement of the upper run of the conveyor belt. With the gate angle part 172B abutting against the discharge end wall, seed is precluded from moving upwardly above part 172B between the metering gate and the discharge end wall and also protects against wind currents moving downwardly between the discharge gate and the discharge wall.

Due to the provision of the ribs, when conveyor is being driven and the lower gate part 172D is in its closed vertical position abutting against the ribs, seeds are being conveyed beneath the lower edge of the metering gate part 172D. In order to pivot the metering gate to its open position wherein the gate part 172D is only a fraction of an inch above the belt upper run, a control member 178 is joined to the pivot rod. Rather than the control member 178, the rod may be pivoted to an open position by any suitable means to create a gap for the passage of material such as by pivotally moving gate 172 manually or by a hydraulic actuator (not shown) or other suitable apparatus.

A disk 179 is pivotally mounted to one of the brackets 176 for abutting against the vertical edge 173A of the adjacent bracket 173. The disk has a spiral shaped outer peripheral surface abuttable against edge 173A, with the disk being retained in a selected angular position relative to bracket 173 by tightening a wing nut 171. Accordingly, the gate may be moved from its closed position to an open position providing the desired gap between the metering gate and the conveyor and control member 178 moved to abut against edge 173A and the wing nut tightened. Thus, the gate can be moved to its closed position and then reopened until control member 178 abuts against edge 173A so that the same gap exists between the gate and the conveyor.

A transverse cylindrical brush 174 is movably and rotatably mounted at the discharge end portion of the frame to extend above and parallel to roller 160. Brush 174 is on the longitudinal side of gate 172 opposite the interior of the hopper 136 and in the same direction from gate 172 as the movement of the upper run of sheeting 70 above the bed plate. The bristles of the brush contact the seeds on the belt after the seeds have started to move downwardly along with the belt and have passed through the vertical plane of the axis of rotation of the roller 160. Thus, the entry nip of the brush and the conveyor belt is on the opposite longitudinal side of the vertical plane of the axis of rotation of the roller 160 from the metering gate 172. Brush 174 is rotated in an opposite direction as roller 160 to propel material on sheeting 70 onto the ground being dressed with sufficient force to penetrate to the base of the turf. The trajectory of the seeds from tangential contact of the brush with the belt is vertically downward to the ground in a direction away from the conveyor. The discharge end portion of the frame 112 is of a construction so as not to interfere with the seed being propelled downwardly by the coaction of the conveyor and the brush.

Advantageously a shield assembly, generally designated 180, is mounted to the frame 112 adjacent to the discharge end of the frame to shield the trajectory of the seed from wind effects as the seed is being downwardly propelled by the brush from the sheeting 70 to the ground. The shield assembly includes transversely spaced frame members 181 mounted to the frame 112 longitudinally opposite the hopper end wall 156 and transversely outwardly of the bristles of the brush 174. A generally U-shaped bracket 182 has its legs mounted to the frame members 181 with its transversely extending web portion at a higher elevation than the top of the brush and longitudinally adjacent to the brush and at a higher elevation than the conveyor upper run. A second generally U-shaped bracket 183 likewise has its legs mounted to frame members 181, but with its web portion more remote from the hopper end wall 156 and at a lower elevation than the web portion of the bracket 182. A generally U-shaped bracket 184 has its legs pivotally attached to the frame members 181 by pivot members 185 for pivotal movement between the solid line lowered position of FIG. 1 to the raised dotted line position so that the bracket web portion is adjacent to the web portion of bracket 183. The web portions of the brackets are transversely centered relative to the brush and are of greater transverse dimensions than the corresponding dimension of the brush.

The shielding assembly includes a sheet of canvas or other suitable material 187 having one transverse edge which has opposite edge portions mounted to the legs of bracket 182 to extend adjacent to the frame members 181 and a web portion mounted to the bracket web portion and an opposite transverse edge mounted to the legs and web portion of bracket 184. With the bracket 184 in its lowered position, the upper web section 180A extends downwardly in a direction away from the discharge end wall 156 from the bracket 182 to bracket 183 and thence along its lower web section 180B at a steeper angle to the web portion of bracket 184 which is at a substantially lower elevation than the brush and the conveyor belt. Thus, the canvas (covering) is of a generally downwardly and longitudinally U-shaped configuration in transverse cross section that opens toward the brush and the hopper 136. The bracket 184 may be pivoted to its raised dotted line position to prevent damage to the shielding assembly, for example when transporting the top dresser over rough terrain (when not applying seed to the terrain) such as going over a curb. When the bracket 184 is in its raised position, advantageously its web portion and the web portion of the canvas is at a higher elevation than the lowermost part of the brush and the conveyor belt. Suitable means (not shown) may be provided for selectively retaining the bracket 184 in its pivoted raised position.

In using the first embodiment with seed having been loaded into the hopper 136, the metering gate 172 in the desired relationship to the upper run of the conveyor and the frame being moved in a longitudinal direction along the terrain with roller 160 and brush 174 rotating, seed is propelled in a downward direction. The shield assembly in its lowered position shields the trajectory of downward movement of seed from the effects of wind as the seed moves out of the exit nip between the brush and the conveyor.

In the event the seeder apparatus 100 is to be used for dispensing top dressing, the gear ratio (gears not being shown) for driving the conveyor relative to the speed of movement of the apparatus over the ground may be increased (gears changed) to drive the conveyor faster than for seeding the terrain. It is to be understood other suitable means, for example, variable speed hydraulic drives may be provided for driving the conveyor and/or brush 174.

For utilizing a top dresser to dispense seeds onto ground with or without top dressing material being dispensed, there is provided a second embodiment of the invention which includes a seeder attachment, generally designated 211 and a top dresser, generally designated 200, which may be of the same construction as that disclosed in U.S. Pat. No. 5,307, 952. The seeder attachment includes a seed hopper 212 mounted to the top dresser, and advantageously to the top dresser hopper, generally designated 236, to extend thereabove. The seed hopper includes an upward extending peripheral wall 212A having a longitudinally narrowed, transversely elongated neck portion to discharge into a seed distributor 203. A metering gate 204 is mounted to the seed hopper for movement between a position blocking gravitational flow of seed from the seed hopper to the distributor and selected opened positions allowing selected metered rates of seed flow to the distributor.

The top dresser hopper 236 includes transversely opposite side walls 237, a discharge end wall 256 and a longitudinally opposite end wall (not shown) to provide an open bottom top dresser hopper that is closed by the upper run of the sheeting 70 of the conveyor 140. At least one end wall 256 may be sloped downwardly toward the opposite hopper end wall to facilitate the movement of material in the top dresser hopper. A slide or chute 205 extends transversely between the hopper side walls and beneath the distributor 203 to cooperate with the top dresser hopper end wall 256 for guiding seed discharged by the distributor 203 to descend onto the sheeting 70 longitudinally intermediate a transverse rotary brush 274 and the hopper end wall 256. The slide has a lower discharge end portion adjacent to and above the upper run of the belt longitudinally intermediate the discharge end wall lower edge and the brush 274.

The transverse dimensions of the slide 205 and distributor are desirably substantially the same as the corresponding dimension of the sheeting 70 so that the seeds are evenly dispersed over the transverse dimension of the sheeting. A drive connection 207 is provided between the rotary vane member 208 of the distributor 203 and the brush 274 and/or the conveyor to maintain the desired rate of seed distribution. The vane member extends transversely substantially the entire transverse dimension of the adjacent part of the discharge end wall 256. Advantageously, there is provided a suitable drive connection (not shown) between the brush and one of the wheels or another suitable type drive, for example, a hydraulic drive (not shown) to the brush and/or the conveyor such that the rate of downward propulsion of seeds and/or top dressing material onto the soil varies with the speed of movement of the vehicle along the terrain to evenly distribute the seed on the terrain.

The lower end of the discharge end wall 256 terminates vertically above the upper run of the sheeting 70, with the upper run extending transversely between the lower end portions of the side walls of the top dresser hopper 236. A top dresser metering gate 272 is movably mounted adjacent to the lower end of the discharge end wall 256 for controlling the amount of material being conveyed from the interior of the top dresser hopper 236 to the transverse brush 274. The metering gate 272 has suitable provisions (not shown) extending through hopper and/or chute walls for being adjusted In a conventional manner.

Advantageously, a shield assembly 215 is mounted to the frame 112 to have its upper web portion 215A above the entire transverse dimension of the brush and is longitudinally curved to have its web portion 215B extend downwardly along the brush opposite the conveyor to extend below the transverse axis of rotation of the brush. The shield web portions extend between and are joined to the vertical legs 215C of the shield assembly that extend along the opposite ends of the brush, with the legs being mounted to the frame 112.

With top dressing material having been loaded into the top dresser hopper and seeds have been loaded into the seed hopper, when material from the top dresser hopper is to be dispensed onto the sheeting 70 and, if at the same time seed is to be dispensed from the seed hopper, the seed is directed to land on the ribbon of top dressing material which is moving out of the top dresser hopper at a specified rate of speed and at a predetermined thickness selected by the operator to achieve the desired results. The seeds are deposited in a quantity established by the setting of the metering gate 204. When the layered material (seed and top dressing) reaches the rotating brush 274 at the discharge end portion of the frame, the layered material is accelerated and driven downwardly into the turf. The layered material is agitated and mixed by the action of the rotating brush, and also during its downward movement. Such action ensures that the seed will be deposited onto the ground in a nearly homogeneous fashion within the top dressing material. The seeds are kept in this close environment with soil particles during this time and will have contact on all of their surfaces, not just those on the bottom, thus greatly increasing the chances of germination. By depositing the layered material, the two tasks of applying top dressing and seed are done simultaneously and thereby a total reduction of time and labor is achieved in contrast to doing the two tasks separately.

If desired to use the second embodiment for dispensing only seed, the top dresser hopper 236 can be left empty. Alternately, if it is desired to apply only top dressing while there is seed in the seed hopper, the metering gate 204 is retained in its closed position to prevent seed moving downwardly into the chute 205.

Although the chute has been shown with an end wall longitudinally spaced from and parallel to the discharge end wall 256 and has side walls extending from the chute end wall to wall 256 to provide a guide that is generally rectangular in horizontal cross section, it to be understood the entire chute may be longitudinally spaced from the discharge end wall. In such an event, the chute would be provided with a second end wall (not shown) parallel to the chute end wall to provide a chute that is rectangular in horizontal cross section and longitudinally spaced from the discharge end wall 256.

Even though the second embodiment has been described and shown as having a seed hopper outside of the top dresser hopper, it is to be understood that a seed hopper may be mounted within the top dresser hopper with the seed being discharged from the seed distributor 203 directly onto the top dresser wall 256. In such an event, the seeder attachment would have a chute extending downwardly along end wall 256 to have its lower end closely adjacent to the conveyor upper run longitudinally intermediate the top dresser hopper end walls. Further, a top dresser metering gate would be mounted to the chute to extend transversely across the top dresser hopper to control the amount of top dresser hopper material passing beneath the chute to pass to the nip between the brush and the conveyor. The seeds, if being dispensed, would descend adjacent to the conveyor on the opposite side of the top dresser metering gate from the material in the top dresser interior.

Further, it is to be understood that even though the invention has been described with reference to the conveyor being an endless belt type conveyor, the conveyor may be a cylindrical drum and a pusher such as described in U.S. Pat. No. 5,307,952, provided the hopper of the respective embodiment is appropriately modified.

With reference to both embodiments, the discharge end wall may be either the front wall or rear wall of the respective hopper, with the end walls extending transverse to the direction of longitudinal movement of the frame when being used to apply seed and/or top dressing to the terrain.

What is claimed is:

1. A method of seeding with grass seed an area of terrain including turf having a base, comprising the steps of: loading grass seed into a seed hopper, moving the seed hopper along the terrain, selectively mechanically conveying grass seed from within the hopper to the exterior of the hopper, and downwardly propelling grass seed exterior of the hopper to the ground along a trajectory that has both vertical and horizontal components with sufficient force to penetrate to the base of the turf.

2. The method of claim 1 further comprising the step of shielding the downward trajectory of the seed from the effects of wind as the seed is being propelled to the ground.

3. The method of claim 2 further comprising the step of dispensing the seed on a layer of top dressing material for being commingled therewith as the seed is being downwardly propelled.

4. The method of claim 1 wherein the selectively mechanically conveying step comprises the steps of:
providing a belt capable of supporting and transporting the seed received from within the hopper; and
conveying the belt so that the seed supported and transported by the belt may be propelled to the ground.

5. The method of claim 4 further comprising the steps of:
providing a plurality of ribs on the belt which form channels with the seed being deposited on the belt to fill the channels, wherein the ribs serve to grip and advance at least a portion of the seed as the belt is conveyed.

6. The method of claim 5 wherein the selectively mechanically conveying step further comprises the steps of:
adjusting a gate between the hopper and the belt to control the amount of seed that is mechanically conveyed to the exterior of the hopper, wherein the gate is variable between an openmost position which allows a maximum amount of seed to be conveyed, and a closed position wherein the gate is positioned proximate the ribs so that only the seed which lies within the channels is conveyed, with the hopper including a discharge end wall having a lower end vertically above the belt, with the discharge end wall extending at an included angle with the belt that is substantially less than 90 degrees and the gate has a lower portion extendable at substantially 90 degrees relative to the belt and an upper portion abutting against the discharge end wall and extending at the same angle as the discharge end wall when the lower portion is extending at 90 degrees relative to the belt; and
controlling the amount of seed which is propelled to the ground by selecting an appropriate position of the gate.

7. The method of claim 6 wherein the downwardly propelling step comprises the steps of:
providing a brush so as to form a nip point between the brush and the conveyor belt; and
rotating the brush so that as the seed is conveyed into the nip point, the brush imparts a force against the seed sufficient to propel the seed towards the ground.

8. The method of claim 7 wherein the downwardly propelling step further comprises the steps of:
causing the brush to contact the seeds on the belt after the seeds have started to move downwardly along with the belt and after the seeds have passed through a vertical plane of an axis about which the belt is conveyed.

9. The method of claim 7 further comprising the steps of:
providing an adjustable shield around the brush and a portion of the belt; and
adjusting the shield so as to protect the seed as it is propelled towards the ground.

10. The method of claim 4 wherein the downwardly propelling step comprises the steps of:
providing a brush so as to form a nip point between the brush and the belt; and
rotating the brush so that as the seed is conveyed into the nip point, the brush imparts a force against the seed sufficient to propel the seed towards the ground.

11. A method of seeding an area of terrain, comprising the steps of:
loading seed into a seed hopper, moving the seed hopper along the terrain, selectively mechanically conveying seed from within the hopper to the exterior of the hopper, and downwardly propelling seed exterior of the hopper to the ground along a trajectory that has both vertical and horizontal components;
shielding the downward trajectory of the seed from the effects of wind as the seed is being propelled to the ground;
providing a moveable frame to support a shield;
raising the frame and the shield when the hopper is to be transported, without dispensing seed; and
lowering the frame and shield, into a shielding position, when the hopper is to dispense seed, so that the propelled seed is protected from the effects of wind.

12. The method of claim 11 further comprising the steps of:
providing a flexible member about the frame to act as the shield;
folding the flexible member as the frame is raised; and
retaining the frame in position.

13. A method of applying material comprising the steps of:

providing a moveable frame;

providing a first hopper coupled to the frame;

providing a second hopper coupled to the frame;

depositing a first material into the first hopper;

depositing a second material into the second hopper;

moving a selected and controllable amount of the first material out of the first hopper;

moving a selected and controllable amount of the second material out of the second hopper;

combining the first and second materials; and propelling the combined first and second materials towards the ground.

14. The method of claim 13 wherein the combining step comprises the steps of:

providing a layer of the first material; and providing a layer of the second material on top of the layer of the first material; and wherein the propelling step includes the step of mixing the first and second materials to form a homogeneous mixture that is propelled to the ground.

15. The method of claim 13 wherein the propelling step further comprises the steps of:

providing a rotating brush; and moving the first and second materials into contact with the brush so that the rotation of the brush mixes the first and second materials together and propels the mixture towards the ground.

16. The method of claim 15 wherein the moving steps and combining step further include the steps of:

providing a conveyor belt proximate an opening in the first hopper and proximate an opening in the second hopper;

moving a preselected amount of the first material out of the first hopper and onto the conveyor belt;

moving a preselected amount of the second material out of the second hopper and onto the first material on the conveyor belt; and advancing the conveyor so as to cause the first and second material to contact the brush.

17. The method of claim 16 wherein the step of providing the brush comprises the steps of:

positioning the brush and the conveyor so as to form a nip point, the nip point occurring at a point where the conveyor belt is moving towards the ground.

18. The method of claim 16 wherein the steps of moving the first and second materials comprises the steps of:

opening a first gate in the first hopper a predetermined amount to allow a preselected amount of the first material to pass from the first hopper onto the conveyor belt, with the first hopper including a discharge end wall having a lower end vertically above the conveyor belt, with the discharge end wall extending at an included angle with the conveyor belt that is substantially less than 90 degrees and the first gate has a lower portion extendable at substantially 90 degrees relative to the conveyor belt and an upper portion abutting against the discharge end wall and extending at the same angle as the discharge end wall when the lower portion is extending at 90 degrees relative to the conveyor belt; and opening a second gate in the second hopper a predetermined amount to allow a preselected amount of the second material to pass from the second hopper onto the first material being conveyed by the belt.

19. The method of claim 18 wherein the step of moving the second material comprises the steps of:

providing a chute from the second gate, wherein the chute has substantially the same width as the opening in the first hopper and the opening in the second hopper;

aligning the chute so that as the preselected amount of the second material falls from the second hopper and out through the chute, the second material covers substantially the entire width of the first material being conveyed by the belt.

20. The method of claim 18 further including:

providing a shield around the brush, a portion of the conveyor, and the first and second materials for at least a portion of a distance the first and second materials are propelled to the ground.

21. The method of claim 13 wherein the first material is top dressing and the second material is seed.

* * * * *